April 26, 1960     G. D. WILLITS     2,934,739
TERMINAL ARRANGEMENT FOR ELECTRIC APPARATUS
Filed Oct. 18, 1956
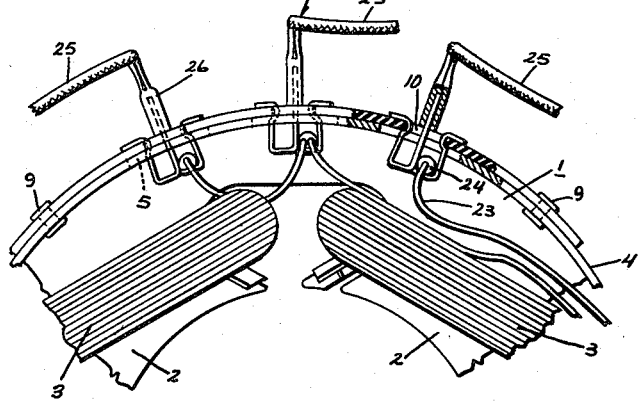
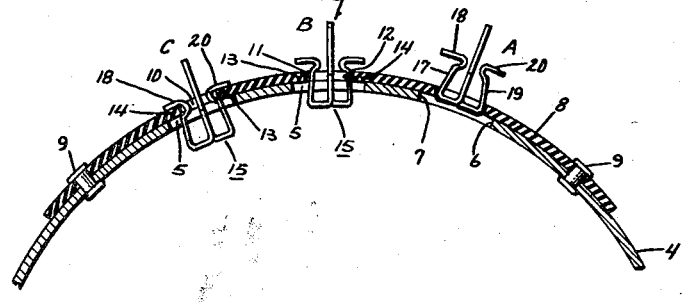
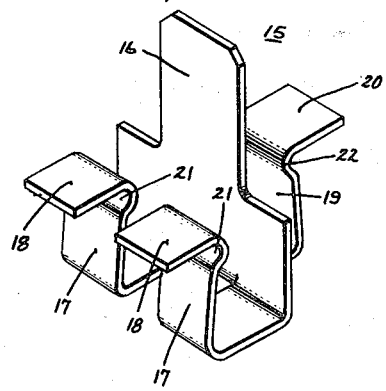
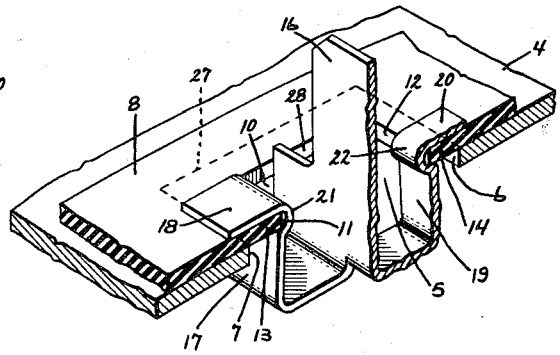
Inventor:
Glenn D. Willits,
by *[signature]*
His Attorney.

United States Patent Office 2,934,739
Patented Apr. 26, 1960

2,934,739

TERMINAL ARRANGEMENT FOR ELECTRIC APPARATUS

Glenn D. Willits, Leo, Ind., assignor to General Electric Company, a corporation of New York Application October 18, 1956, Serial No. 616,858

3 Claims. (Cl. 339—220)

This invention relates to electric apparatus, and more particularly to an improved terminal arrangement for such apparatus.

In order to provide the necessary electric power connections to electric apparatus such as dynamoelectric machines and transformers, they must be provided with some type of terminal arrangement whereby external conductors may be electrically connected to the internal parts of the apparatus. Since such arrangements perform no positive function insofar as the operation of the apparatus itself is concerned, it is most desirable to keep the space they use and the expense of providing them to an absolute minimum. This is particularly true in the case of small dynamoelectric machines, and more particularly motors, where there is great commercial competition and where, consequently, even small changes in the cost or size of the motor can become important.

In the past, it has been customary to provide in such motors a terminal board of insulating material. The board was provided with the necessary terminals secured thereon and was mounted in the motor. This arrangement was relatively expensive, requiring a special motor construction, and, further, usually resulted in the terminals being relatively inaccessible. This raised a further objection since, in addition to size and cost, it is most desirable in the case of small electric motors that the assembly of the terminal arrangement in the motor be easily effected, and that there be fast connection of external conductors to the terminals. It is, consequently, most desirable to provide a terminal arrangement where the cost of the parts, including the terminals, is very low, assembly of the terminals in the apparatus is easy, there is little structural change or increase in the size of the apparatus attributable to the presence of the terminals, and external connections can be made swiftly and easily.

It is, therefore, an object of this invention to provide an improved terminal arrangement for electric apparatus incorporating the desirable features set forth above.

A further object is the provision of a simple terminal arrangement economical to manufacture and easy to assemble in electrical apparatus.

Another object of the invention is to provide an improved terminal member which, when used in the terminal arrangement, will provide for easy assembly and will be readily accessible from without the housing.

In one aspect thereof, the invention provides, in electric apparatus, a housing of conductive material having an opening of a predetermined length in a predetermined direction formed therein. A sheet of rigid insulating material is secured to one side of the housing and has an opening formed therein over the housing opening. The sheet opening has, in the predetermined direction, a smaller predetermined length than the housing opening; a metallic terminal member is secured within the sheet opening by engagement with the sides thereof at each end of the predetermined length thereof. The difference in the opening lengths permits the terminal member to be secured to the sheet in spaced relation to the edges of the housing opening so that it is suitably insulated therefrom.

The features of the invention which are believed to be novel are set forth with particularity in the appended claims. The invention, itself, however, together with further objects and advantages thereof, may best be understood by reference to the following detailed description taken in connection with the accompanying drawing.

In the drawing, Figure 1 is a fragmentary end view of an electric motor incorporating the improved terminal arrangement of this invention;

Figure 2 is a view in cross section further illustrating the construction of the improved terminal arrangement;

Figure 3 is a view in perspective of a preferred terminal construction for use in the terminal arrangement; and Figure 4 is a fragmentary view in perspective, partly in cross section, illustrating the cooperation of the terminal of Figure 3 with the remainder of the terminal assembly.

Referring now to the figures of the drawing, there is shown in Figure 1 a shaded pole induction motor (representative of the electric apparatus to which the invention is applicable) provided with a stator 1 having salient poles 2 with coils 3 formed on the poles. Stator 1 is secured within a housing member 4 of conductive material which has a plurality of openings 5 of the type frequently provided for ventilation purposes. Each opening 5 in housing 4 has edges 6 and 7 and is of a predetermined length in the direction between those edges. A thin sheet of relatively rigid insulating material such as, for instance, nylon, is secured to housing 4 by any desired means such as, for instance, rivets 9. Openings 10 are formed in sheet 8 overlying openings 5 in housing 4. Each sheet opening 10 has edges 11 and 12 defining a predetermined length for opening 10 in the same direction as the predetermined length of opening 5; the length of opening 10 is less than that of opening 5. With this construction, each opening 10 provides a pair of lips 13 and 14 in the sheet 8 which extend beyond the edges 6 and 7 of housing 4. The widths of openings 10 and 5 have substantially the same relationship as the lengths thereof, as can be seen in Figure 4 from the positions of edges 27 and 28 of openings 5 and 10 respectively.

Referring now particularly to Figure 3, there is shown a terminal 15 which includes a male terminal portion 16, a pair of legs 17 having feet 18 on one side of terminal portion 16, and a leg 19 having a foot 20 on the other side thereof. The legs are substantially parallel to the terminal portion 16, while feet 18 and 20 are bent approximately at right angles thereto. In the preferred construction, a small recess 21 is provided at the junction of each foot 18 with its corresponding leg 17; a similar recess 22 is provided for leg 19 and foot 20. Terminal 15 is made of thin sheet conductive material which preferably has some spring qualities for a purpose which will appear herebelow. It will be readily apparent that terminal 15 may be speedily manufactured in large quantities at a very low price by forming the entire terminal from a thin substantially rectangular portion of sheet material. One end is formed into portion 16, and the other is cut longitudinally to form leg 19, recess 22, and foot 20; there then remain two strips which are then similarly formed into legs 17, recesses 21, and feet 18.

To assemble a terminal 15 within an opening 10, it is introduced into the opening as shown at A in Figure 2; this action is continued with the legs being forced together, as shown at B, until terminal 15 has moved down to the position shown at C where legs 17 and 19 spring apart to cause feet 18 and 20 respectively to engage the outer surface of lips 13 and 14 in sheet 8. In this position terminal 15 is held by the engagement of lips 13 and 14 within recesses 21 and 22. Since the distance between edges 6 and 7 of opening 5 is considerably more than the distance between edges 11 and 12 of opening 10, and since terminal 15 fits snugly within the width of opening 10, all parts of terminal member 15 are spaced from housing 4 and in contact only with sheet 8.

Coils 3 may be suitably connected to the terminals 15 by soldering conductors 23 extending from the coils to the terminals, as shown at 24. The terminal arrangement is then ready for use. To connect coils 3 to an outside source of power, it is merely necessary to provide conductors 25 extending across the source with quick-connect female terminals 26 at the ends thereof. Terminals 26 may then be forced into engagement with terminal portions 16 of terminals 15 so as to secure the electrical connections.

While an especially beneficial terminal member 15 has been described, it will be understood that in the broader aspect of the invention, it is possible to use other simple and economically available terminals provided the same relationship is present between the terminal, the sheet 8 of insulating material and the housing 4 of conductive material.

While the invention has been explained by describing a particular embodiment thereof, it will thus be apparent that improvements and modifications may be made without departing from the scope of the invention as defined in the appended claims.

What I claim as new and desire to secure by Letters Patent of the United States is:

1. In electric apparatus, a housing member of conductive material having an opening of a predetermined length in a predetermined direction formed therein, a sheet of rigid insulating material secured to one side of said housing and having an opening formed therein over said housing opening, said sheet opening having a second smaller predetermined length in said predetermined direction, and a metallic terminal member comprising a central terminal portion extending through said sheet opening for attachment of a first electrical connection thereto on one side of said sheet and re-entrant side leg portions extending through said sheet opening for attachment of a second electrical connection thereto on the other side of said sheet, said member being secured within said sheet opening by engagement of its side leg portions with the sides of said sheet opening at each end of the predetermined length thereof, said terminal member being in spaced relation to the edges of said housing opening and accessible from outside said housing.

2. In electric apparatus, a housing member of conductive material having an opening formed therein of a predetermined length in a predetermined direction, a sheet of rigid insulating material secured to the outside of said housing member and having an opening formed therein over said housing opening, said sheet opening having a second smaller predetermined length in said predetermined direction, and a metallic terminal member comprising a central terminal portion extending through said sheet opening for attachment of a first electrical connection thereto on one side of said sheet, and a pair of substantially parallel legs extending through said sheet opening for attachment of a second electrical connection thereto on the other side of said sheet, said legs having recesses formed on the outer surfaces thereof, and said terminal member being secured within said sheet opening by engagement of said recesses with the sides of said sheet opening at each end of said predetermined length thereof, said terminal member being in spaced relation to the edges of said housing opening and accessible from outside said housing.

3. In electric apparatus, a housing member of conductive material having a rectangular opening of predetermined length and width formed therein, a sheet of rigid insulating material secured to the outside of said housing and having a rectangular opening formed therein over said housing opening with its length and width extending in the same directions as those of said housing opening, said sheet opening having a smaller length and a smaller width than said housing opening, and a metallic terminal member comprising a central terminal portion extending through said sheet opening for attachment of a first electrical connection thereto on one side of said sheet and having a pair of parallel legs extending through said sheet opening for attachment of a second electrical connection thereto on the other side of said sheet, said legs being formed with recesses on the outside thereof, and said terminal member being secured within said sheet opening by engagement of said recesses with the sides of said sheet opening at each end of the length thereof, said terminal member being of a width to fit snugly within the width of said sheet opening and being spaced from the edges of said housing opening and being accessible from outside said housing.

References Cited in the file of this patent

UNITED STATES PATENTS

| | | |
|---|---|---|
| 711,670 | McGill | Oct. 21, 1902 |
| 946,741 | Trumbull | Jan. 18, 1910 |
| 1,975,820 | Wright | Oct. 9, 1934 |
| 2,057,718 | Gunthorp | Oct. 20, 1936 |
| 2,668,279 | Epstein | Feb. 2, 1954 |
| 2,694,799 | Del Camp | Nov. 16, 1954 |
| 2,741,751 | Weiler | Apr. 10, 1956 |